United States Patent [19]

Wilcox

[11] Patent Number: 4,917,524

[45] Date of Patent: Apr. 17, 1990

[54] LOCKING CLIP

[75] Inventor: Harry E. Wilcox, Plymouth, Mich.

[73] Assignee: Chrysler Corporation, Highland Park, Mich.

[21] Appl. No.: 306,723

[22] Filed: Feb. 6, 1989

[51] Int. Cl.⁴ .............................................. F16B 1/00
[52] U.S. Cl. ..................................... 403/12; 403/366; 200/61.54; 280/731; 74/492; 74/552
[58] Field of Search ..................... 74/548, 484 R, 552, 74/492; 188/70 R, 68; 280/731, 734, 775; 403/366, 12; 29/159 B, 436, 437, 450, 453; 200/61.54, 61.55; 439/15, 16

[56] References Cited

U.S. PATENT DOCUMENTS

| | | |
|---|---|---|
| 1,383,994 | 7/1921 | Olson .................................... 74/548 |
| 3,632,135 | 1/1972 | Chute .................................... 280/731 |
| 4,289,414 | 9/1981 | Recker ................................... 403/12 |
| 4,660,500 | 4/1987 | Zeller et al. ...................... 280/731 X |
| 4,735,573 | 4/1988 | Zeller et al. ...................... 403/12 X |

Primary Examiner—Rodney M. Lindsey
Attorney, Agent, or Firm—Edward A. Craig

[57] ABSTRACT

A steering wheel assembly including a motor/stator mechanism prevented from unwanted relative rotation by a spring clip which is released from the lock relation upon assembly with the hub of the steering wheel.

6 Claims, 2 Drawing Sheets

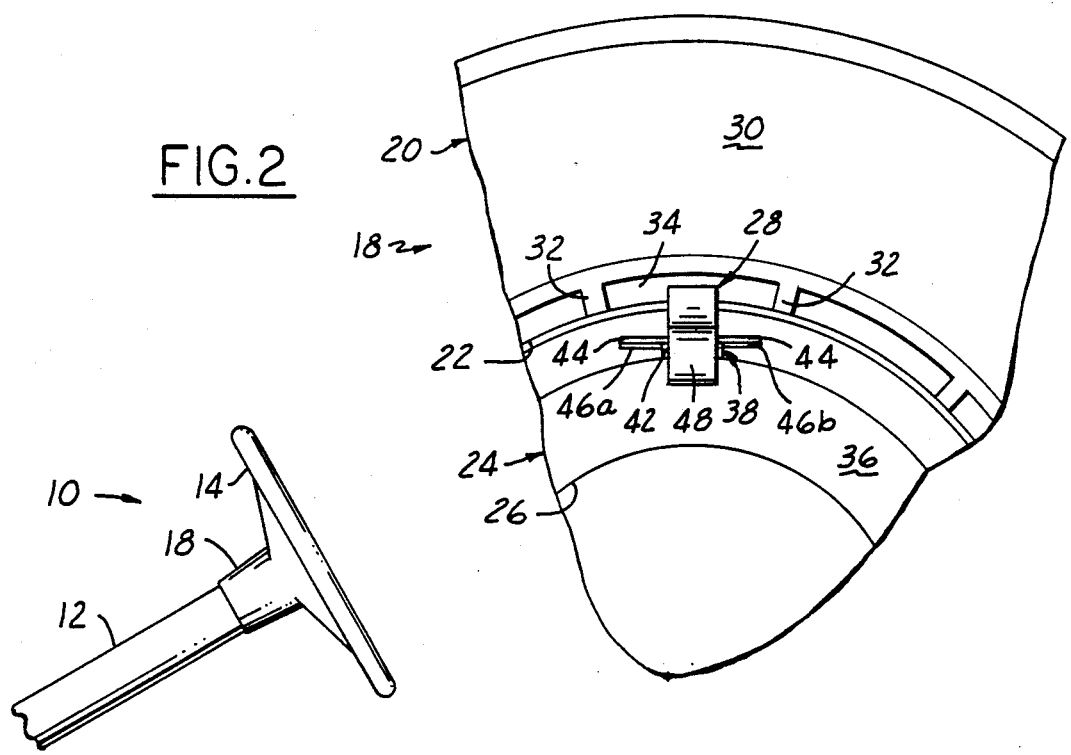
FIG. 2
FIG. 1
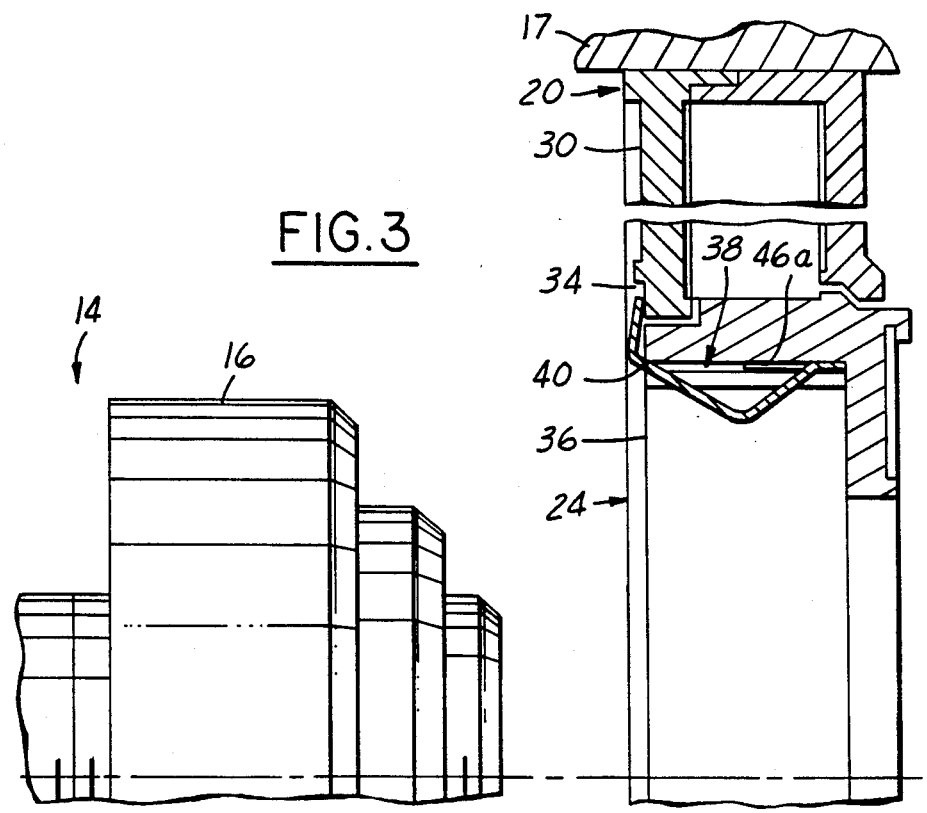
FIG. 3

LOCKING CLIP

BACKGROUND AND SUMMARY OF THE INVENTION

This invention relates to a releasable locking clip for a rotor positioned within a stator.

An automobile includes a steering wheel assembly which has a steering wheel that is mounted on a steering wheel column. The wheel assembly typically includes various mechanical indicator members which when manipulated by the driver activate various switches and other such electrical apparatus, such as turn signals, and the horn and, most recently, includes an electronic air bag triggering mechanism. This mechanism includes a rotor positioned within a stator with the stator being adapted to be nonrotatably secured in the column and the rotor being adapted to be secured to and rotate with the wheel. The rotor/stator mechanism is mounted on the steering wheel column before the wheel is mounted but it is necessary that the rotor assume a certain position with respect to the steering wheel after the wheel is mounted. Accordingly the rotor must initially be locked with respect to the stator. However, after the steering wheel is mounted, the rotor must be released for rotation.

In accordance with this invention the rotor/stator mechanism is provided with a locking and unlocking arrangement wherein the rotor is locked relative to the stator before the mechanism is mounted and released for rotation when the steering wheel is mounted. In particular, this arrangement is characterized by a flexible spring clip which has a base plate fixedly mounted on the rotor and a deflectable arm which has a V-shaped knee and extends from the plate to a deflectable free end that is normally positioned in a detent formed between a pair of ribs on the stator. Rotation of the rotor with respect to the stator is blocked by engagement of the arm end with either of the ribs. Insertion of the steering wheel causes the hub to engage the knee, thereby causing the free end of the arm to move outwardly of the detent.

Features of this locking/unlocking arrangement include a spring clip which is economical to manufacture and enhances both ease and speed with which it is installed in the mechanism. Further, unlocking is achieved merely by mounting the hub to the column.

These and other features of the invention will now be described in detail in the specification and then pointed out more particularly in the appended claims.

BRIEF DESCRIPTION OF THE DRAWINGS

FIG. 1 shows a portion of a steering wheel assembly of an automobile vehicle having a rotor/stator mechanism mounted in the steering wheel column;

FIG. 2 is a cut-away end elevation view showing part of the mechanism and the locking clip therefor in accordance with the present invention;

FIG. 3 is a partial side view in section of a steering wheel hub positioned for mounting in the mechanism in accordance with the present invention;

DETAILED DESCRIPTION OF THE PREFERRED EMBODIMENT

Figure 4:
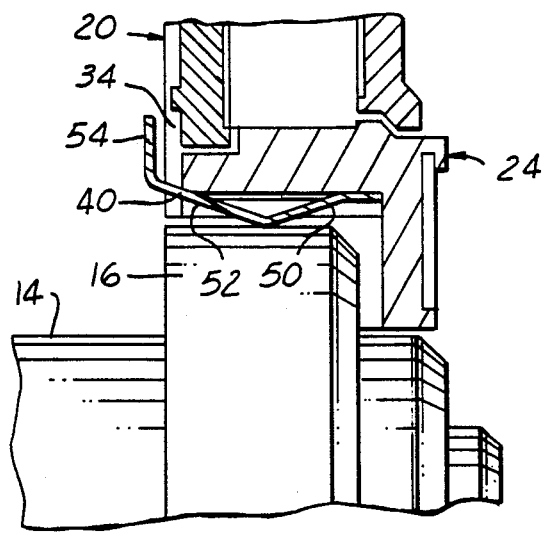
FIG. 4 is similar to FIG. 3 but showing the steering wheel hub assembled into the mechanism.

Turning now to the drawings there is shown a steering wheel assembly 10 having a column 12 for mounting a steering wheel 14 that rotates relative to the column and a rotor/stator mechanism 18 for electronically triggering an air bag (not shown). The rotor/stator mechanism 18 includes a stator 20 having a central opening 22, a rotor 24 that is interfitted into opening 22 and having a central opening 26, and a flexible locking clip 28 which limits relative rotation between the rotor and stator. The stator 20 is generally cylindrical and includes the central opening 22, an end face 30 and a plurality of angularly spaced radially directed ribs 32 each rib pair defining a detent 34.

The rotor 24 is generally cylindrical and includes the central opening 26, and a generally flat end face 36 into which extends a shaped axial cavity 38, the intersection of the cavity with end face 36 forming a generally 90° shoulder 40 that defines a fulcrum. The cavity is suitably configured to allow inward axial insertion of the spring clip 28. As shown, the cavity is described by a central channel 42 and a pair of lateral slots 44, the slots being sized to slidably receive a respective plate portion 46a and 46b and the central channel 42 sized to pass a resiliently deflectable arm 48 of spring clip 28. As shown, end faces 30 and 36 are generally coplanar and perpendicular to the axis through the cylinders.

The clip 28 in the embodiment shown is integrally stamped and formed from sheet metal to include a base plate 46 and the arm 48 which projects therefrom, the plate having oppositely directed plate portions 46a and 46b. The arm 48 has, in succession, a first, a second and a third portion 50, 52 and 54 which describe a V-shaped knee and a foot, first portion 50 being connected to base plate 46, the first and second portions 50 and 52 forming the knee, and the third portion 54 extending from the knee to form the foot. Preferably, the leg is generally flat and wide to provide rigidity to resist undesired rotation should the ribs 32 be rotatably driven against the foot portion 54. The angular separation between ribs 32 and the width of foot portion 54 could be dimensioned such that spring clip 28 limits to any desired degree or even totally prevents the rotor from rotating relative to the stator.

Figure 5:
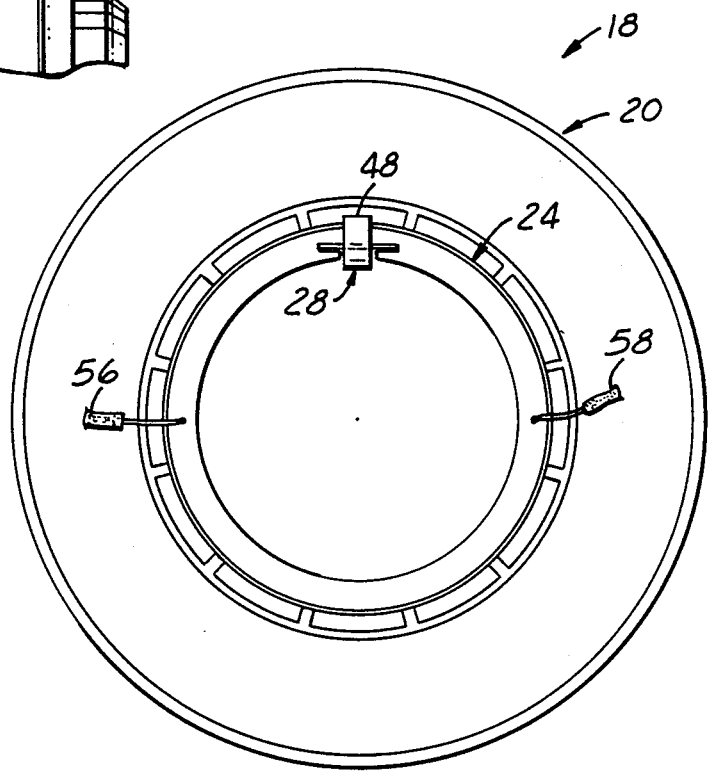
FIG. 5 is an end view of the assembly shown in FIG. 4.

Shown best in FIG. 5, electrical wires 56 and 58, respectively, extend from the rotor for completing electrical interconnections with the air bag and a horn (not shown).

Figure 6:
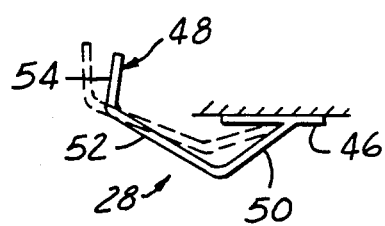
FIGS. 6 and 7 show detail of the locking clip forming a part of the present invention.
Figure 7:
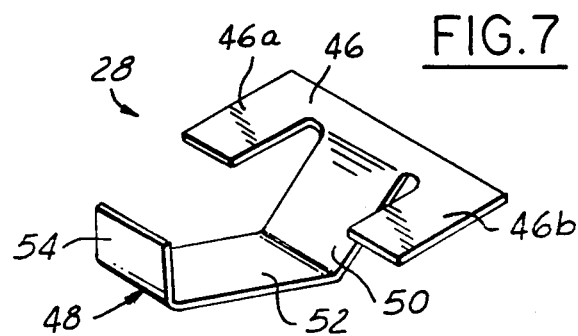

In operation, the spring clip 28 is inserted into cavity 38 and has the deflectable free end of its third portion 54 defining the foot disposed in a detent 34 thereby resisting (or limiting) relative rotation between the stator and rotor. The clip positions the rotor 24 at a "center position" relative to the stator. The rotor/stator mechanism 18 is assembled onto the column and the stator 20 secured thereto by a pair of screws (not shown) such that the stator will be fixedly secured so as to not rotate relative to the column indicated at 17 in FIG. 3. At this point, spring clip 28 prevents relative rotation between the stator and rotor. The hub 16 is inserted into opening 26 of the rotor whereupon the inward projection of the V-shaped knee is engaged by the hub. The second portion 52 of the knee is biased against the shoulder 40 such that continued insertion of the hub causes the second portion to pivot the third portion 54 about the shoulder fulcrum whereby the foot end is deflected outwardly from within its detent. FIG. 6 shows the original shape of spring clip 48 and the dotted lines show the shape when engaged by hub 16. At this point, stator 20 cannot rotate relative to the column but rotor 24 will rotate relative to stator 20. The rotor is then secured to the wheel for rotation therewith.

While the above description constitutes the preferred embodiment of the invention, it will be appreciated that the invention is susceptible to modification, variation, and change without departing from the proper scope or fair meaning of the accompanying claims. For example, the clip could be comprised of a resilient plastic and used to couple electromagnetic apparatus other than that shown. Further, the mounting could be such that the detents and spring clip are provided, respectively, on the rotor and stator.

What I claim is:

1. A coupled electromechanical mechanism easily uncoupled for relative rotation when in an assembly comprising a first member mounted for rotation relative to a second member, comprising a rotor mounted in a stator, said stator being adapted to be nonrotatably secured to said second member and said rotor adapted to receive and rotate with said first member, and lock means forming pat of the electromechanical mechanism carried by said mechanism for resisting said stator from rotating relative to said rotor but permitting rotation when receiving said first member, said stator and rotor being generally cylindrical and each including an end face, the end faces being generally coplanar and perpendicular to the cylinder axis, and said lock means including a detent and a spring clip which has a resiliently deflectable leg adapted to releasably engage the detent and resist said stator rotating relative to said rotor, said spring clip and detent being received in one of said stator and rotor and associated with the end face on the other of said stator and rotor.

2. The mechanism as recited in claim 1 wherein said stator includes said detent and the spring clip is mounted to said rotor.

3. The mechanism as recited in claim 2 wherein said rotor has an axially extending groove and said spring clip includes a generally flat plate from which said deflectable leg projects, said plate being received in said groove, and said leg having a V-shaped knee and a foot which is normally biased into the detent to resist said rotation, the knee being engageable to deflect the foot out of said detent to permit said rotation.

4. The mechanism as recited in claim 2 wherein said leg has, in succession, a first, second and third portion, the first portion extending from said plate, said first and second portions forming an engageable knee, and said third portion forming a deflectable end extending into said detent to prevent said rotation, the third portion being deflectable from the detent upon engagement of the knee to permit said rotation.

5. The mechanism as recited in claim 1 wherein said stator includes a plurality of radially extending ribs which define angularly spaced detents, and said spring clip has a body disposed in a complementary cavity formed in said rotor and a deflectable leg which is adapted to engage one said detent, the leg having a V-shaped knee portion and a foot extending from said knee to fit between a pair of ribs defining one said detent, the knee being engageable to deflect the foot out of said detent.

6. The mechanism as recited in claim 5 wherein said rotor end face and cavity extend inwardly of said face to position said spring clip and form a shoulder that defines a fulcrum which engages the leg of said clip.

* * * * *